(12) United States Patent
Ohashi et al.

(10) Patent No.: US 8,323,148 B2
(45) Date of Patent: Dec. 4, 2012

(54) POWER TRANSMITTING APPARATUSES

(75) Inventors: Tatsuyuki Ohashi, Hamamatsu (JP); Shouji Asatsuke, Hamamatsu (JP); Akio Oishi, Hamamatsu (JP); Ryouhei Chiba, Hamamatsu (JP); Jun Ishimura, Hamamatsu (JP); Keiichi Ishikawa, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 13/235,145

(22) Filed: Sep. 16, 2011

(65) Prior Publication Data

US 2012/0067685 A1  Mar. 22, 2012

Related U.S. Application Data

(63) Continuation of application No. PCT/JP2010/054514, filed on Mar. 17, 2010.

(30) Foreign Application Priority Data

Mar. 18, 2009  (JP) .................................. 2009-066746

(51) Int. Cl.
  *B60W 10/00* (2006.01)
(52) U.S. Cl. .......................................... 477/83
(58) Field of Classification Search .................... 477/77, 477/78, 79, 83, 86, 106, 90, 101, 105, 166, 477/171, 172, 210, 203, 168, 170, 204, 199, 477/200
See application file for complete search history.

(56) References Cited

U.S. PATENT DOCUMENTS

| 5,088,352 A | 2/1992 | Ishimaru |
| 5,417,621 A | 5/1995 | Tibbles |
| 6,482,127 B2 * | 11/2002 | Katou ............................ 477/192 |
| 7,192,383 B2 | 3/2007 | Shimada et al. |
| 7,556,588 B2 | 7/2009 | Park |
| 7,558,666 B2 * | 7/2009 | DiGonis ....................... 701/112 |

(Continued)

FOREIGN PATENT DOCUMENTS

JP  2000-328980  11/2000

(Continued)

OTHER PUBLICATIONS

Microfilm of the specification and drawings to the request of Japanese utility Model Application No. 118068/1987 (Laid-open No. 024760/1989), Feb. 10, 1989, Nissan Diesel Motor Co., Ltd.

(Continued)

*Primary Examiner* — David D Le
*Assistant Examiner* — David J Hlavka
(74) *Attorney, Agent, or Firm* — Knobbe, Martens, Olson & Bear, LLP

(57) ABSTRACT

A power transmitting apparatus for a vehicle mounted with a torque converter can be configured to instantly supply sufficient oil to a clutch mechanism on restart of the engine after an idle-stop without an electrically-driven oil pump. A power transmitting apparatus can comprise a torque converter having a torque amplifying function, a clutch mechanism, an oil pump, a clutch control device, an engine control device, and a flow control device. The oil pump can be driven by the driving power of the engine to supply oil to the clutch mechanism and the torque converter to operate them. The flow control device can be configured to limit or prevent the supply of oil to the torque converter by the oil pump and to prioritize the supply of oil to the clutch mechanism when the engine is restarted by the engine control device after the idle-stopped condition.

13 Claims, 15 Drawing Sheets

U.S. PATENT DOCUMENTS

| | | |
|---|---|---|
| 7,693,636 B2 * | 4/2010 | Katou et al. .................... 701/54 |
| 8,246,511 B2 | 8/2012 | Ohashi et al. |
| 2003/0197385 A1 * | 10/2003 | Onoyama et al. ........... 290/40 R |
| 2006/0189436 A1 | 8/2006 | Nakashima et al. |
| 2009/0298644 A1 | 12/2009 | Nihei et al. |
| 2012/0053012 A1 | 3/2012 | Yamada et al. |

FOREIGN PATENT DOCUMENTS

| | | |
|---|---|---|
| JP | 2005-003193 | 1/2005 |
| JP | 2005-98392 | 4/2005 |
| JP | 2003-227565 | 8/2005 |

OTHER PUBLICATIONS

International Search Report for PCT/JP2010/054514 mailed May 11, 2010.

International Search Report for PCT/JP2010/054513, mailed May 11, 2010.

* cited by examiner

Fig 10

| Mode | Shift solenoid VLV. | | Clutch | | Torque converter flow rate |
|---|---|---|---|---|---|
| | SH A (29) | SH B (30) | 1st clutch device | 2nd clutch device | |
| Idle-stop & 2nd clutch devices start / speed reduction | × | × | × | Linear solenoid A (28) | Small |
| 1st clutch device | ○ | ○ | Line pressure | × | Large |
| 1st clutch device in-gear | × | ○ | Linear solenoid A (28) | × | Large | ered and can be configured to prioritize the supply of oil to the clutch mecha-
POWER TRANSMITTING APPARATUSES

CROSS-REFERENCE TO RELATED APPLICATIONS

This application is a continuation of PCT Application No. PCT/JP2010/054514, filed on Mar. 17, 2010, which claims priority to Japanese Application No. 2009-066746, filed on Mar. 18, 2009, the entire contents of each of which are hereby incorporated by reference.

BACKGROUND OF THE INVENTIONS

1. Field of the Inventions

The present inventions relate to power transmitting apparatuses, such as vehicle transmissions, which transmit power from an engine of a vehicle to the wheels of the vehicle and which are configured to properly select transmission of power and cutting-off of power to or from the wheels.

2. Description of the Related Art

Two types of known power transmitting apparatuses for vehicles (e.g., "automatic transmissions") provide starting power (power for initiating movement of the vehicle from a stop) in different ways. One type uses a torque converter ("torque converter type") and another type uses a starting clutch ("starting clutch type") to provide starting power used to start the movement of the vehicle from a stop. In the torque converter type devices, the starting performance benefits from the torque amplifying function of the torque converter. On the other hand, the starting clutch type benefits from increased efficiency because this type of system does not continuously lose power through slippage which occurs in the torque converter types e.g. during a steady running of vehicle.

Japanese Laid-open Patent Publication No. 3193/2005 discloses a power transmitting apparatus which is a torque converter type automatic transmission combined with a lock-up clutch. In this transmission, the lock-up clutch has a clutch piston connected to a turbine of a torque converter and is movable between a connected position in which it abuts against the inner circumferential surface of a torque converter cover and a non-connected separated position. Thus, the torque converter cover and the turbine can be directly connected and disconnected via the clutch piston.

Japanese Laid-open Patent Publication No. 227565/2003 discloses a power transmitting apparatus of the torque converter type having an idle-stop function for automatically stopping an engine when a vehicle is stopped. This power transmitting apparatus comprises an oil pump driven by power from the engine to supply a clutch mechanism and the torque converter with oil to actuate them and additionally comprises an electrically-driven oil pump to supply the clutch mechanism and the torque converter with oil when the engine is restarted after being in an idle-stopped condition.

SUMMARY OF THE INVENTIONS

An aspect of at least one of the inventions disclosed herein includes the realization that a power transmitting apparatus for a vehicle with a torque converter can be configured to instantly supply sufficient oil to the clutch mechanism on the restart of the engine after the idle-stop condition without an electrically-driven oil pump and, thus, the manufacturing cost of the power transmitting apparatus can be reduced.

Although the starting performance of the power transmitting apparatus of Japanese Laid-open Patent Publication No. 227565/2003 benefits from the torque-amplifying function of the torque converter, that power transmitting apparatus requires an electrically-driven oil pump in addition to the oil pump, which increases the manufacturing cost of the power transmitting apparatus.

More specifically, since the engine is stopped in the idle-stopped condition, the engine-powered oil pump is also stopped. Accordingly, the engine-powered oil pump cannot instantly supply oil when the engine is restarted after an idle-stop. Thus, the electrically-driven oil pump, which always can be driven, even when the engine is idle-stopped, is additionally used to supply oil. Because oil is supplied to both the torque converter and the clutch mechanism on the restart of the engine, a problem results in that sufficient oil supply to the clutch mechanism cannot be achieved when the engine is restarted after the idle-stop. Thus, the electrically-driven oil pump is required to be used as an auxiliary pump in the prior art power transmitting apparatus.

Thus, in accordance with an embodiment, a power transmitting apparatus can comprise a torque converter having a torque amplifying function, a clutch mechanism, an oil pump, a clutch control device, an engine control device, and a flow control device. The clutch mechanism can be configured to be positioned in a first power transmitting condition in which driving power of an engine is transmitted to driving wheels via a power transmitting system of the torque converter and a second power transmitting condition in which the driving power of the engine is transmitted to the wheels without the power transmitting system of the torque converter. The oil pump can be driven by the driving power of the engine to supply oil to the clutch mechanism and the torque converter to operate them. The clutch control device can be configured to selectively operate the clutch mechanism in accordance with a vehicle condition to position the clutch mechanism either in the first power transmitting condition or the second power transmitting condition. The engine control device can be configured to idle-stop the engine by automatically stopping the engine when vehicle speed is reduced below a predetermined value and to restart the engine when the accelerator pedal is depressed or the brakes are released during an idle-stopped condition. The flow control device can be configured to limit or prevent the supply of oil to the torque converter by the oil pump and to prioritize the supply of oil to the clutch mechanism when the engine is restarted by the engine control device after the idle-stopped condition.

In some embodiments, the flow control device can comprise a hydraulic valve mechanism having a first supply path configured to normally supply oil to the torque converter, a second supply path configured to limit or prevent the supply of oil, and a valve configured to open and close the first supply path by hydraulic pressure.

In some embodiments, the valve can be normally urged in a direction for closing the first supply path.

In some embodiments, the power transmitting apparatus can further comprise an accumulator configured to accumulate the oil and can be configured so that the oil accumulated in the accumulator is discharged therefrom to the clutch mechanism when the engine is restarted by the engine control device after the idle-stopped condition.

In some embodiments, the power transmitting apparatus can further comprise a detecting device configured to detect whether the clutch mechanism is in a state capable of transmitting power or not and the limitation or prevention of the supply of oil to the torque converter by the flow control device can be cancelled after detecting device has detected the state capable of transmitting power.

In some embodiments, the engine can be automatically restarted by the engine control device when a predetermined duration of time of the idle-stop condition has lapsed.

In some embodiments, the clutch mechanism can comprise a first clutch device operated during forward vehicle operation and configured to transmit the driving power of the engine to the driving wheels via the power transmitting system of the torque converter and a second clutch device operated during forward vehicle operation and configured to transmit the driving power of the engine to the driving wheels without the power transmitting system of the torque converter, the clutch control device can be configured to selectively operate the first clutch device and the second clutch device in accordance with the vehicle condition to position them in either the first power transmitting condition or the second power transmitting condition, and the clutch control device can be configured to operate only the second clutch device when the engine is restarted by the engine control device after the idle-stopped condition.

In some embodiments, the power transmitting apparatus can further comprise a first driving shaft connected to the first clutch device and a second driving shaft connected to the second clutch device. The first driving shaft can be configured to be rotated by the driving power of the engine via the power transmitting system of the torque converter. The second driving shaft can be configured to be rotated by the driving power of the engine without the power transmitting system of the torque converter. The first and second driving shafts can be arranged coaxially with each other.

In some embodiments, the clutch mechanism can comprise a forward-operation clutch device operated during forward vehicle operation and a lock-up clutch device. The forward-operation clutch device can be configured to transmit the driving power of the engine to the driving wheels via the power transmitting system of the torque converter. The lock-up clutch device can be configured to transmit the driving power of the engine to the driving wheels without the power transmitting system of the torque converter. The clutch control device can be configured to selectively operate the forward-operation clutch device and the lock-up clutch device in accordance with the vehicle condition to position them in either the first power transmitting condition or the second power transmitting condition.

In some embodiments, an automatic variable speed unit can be operatively positioned between the clutch mechanism and the driving wheels to transmit power from the engine to the driving wheels.

In some embodiments, the automatic variable speed unit can be a continuously variable transmission (CVT).

In some embodiments wherein the power transmitting apparatus further comprises a flow control device configured to limit or prevent the supply of oil to the torque converter by the oil pump and to prioritize the supply of oil to the clutch mechanism when the engine is restarted by the engine control device after the idle-stopped condition, it is possible in a power transmitting apparatus for a vehicle mounted with a torque converter to instantly supply sufficient oil to the clutch mechanism on the restart of engine after the idle-stop and thus the electrically driven oil pump can be eliminated and the manufacturing cost of the power transmitting apparatus can be reduced.

In some embodiments wherein the flow control device comprises a hydraulic valve mechanism having a first supply path configured to normally supply oil to the torque converter, a second supply path configured to limit or prevent the supply of oil, and a valve configured to open and close the first supply path by hydraulic pressure, it is possible instantly and smoothly switch between the configuration in which the supply of oil is limited or prevented and the configuration in which the supply of oil is not limited or prevented.

In some embodiments wherein the valve is normally urged in a direction for closing the first supply path, the supply of oil to the torque converter can be reliably limited or prevented regardless of the response of the valve when the engine is restarted after the idle-stop.

In some embodiments wherein the power transmitting apparatus further comprises an accumulator configured to accumulate the oil and is configured so that the oil accumulated in the accumulator is discharged therefrom to the clutch mechanism when the engine is restarted by the engine control device after the idle-stopped condition, oil can be supplied instantly and smoothly to the clutch mechanism when the engine is restarted after the idle-stop.

In some embodiments wherein the power transmitting apparatus further comprises a detecting device configured to detect whether or not the clutch mechanism is in a state capable of transmitting power and the limitation or prevention of the supply of oil to the torque converter by the flow control device is cancelled after the detecting device has detected the state capable of transmitting power, oil can be supplied instantly and smoothly to the clutch mechanism when the engine is restarted after the idle-stop and also to exert to the maximum the torque amplifying function of the torque converter when a vehicle begins moving from a stop.

In some embodiments wherein the engine is automatically restarted by the engine control device when a predetermined duration of time of the idle-stop condition has lapsed, it is possible to prevent reduction of a driving response of the engine when the engine is restarted after the idle-stopped condition.

In some embodiments wherein the clutch mechanism comprises a first clutch device operated during forward vehicle operation and configured to transmit the driving power of the engine to the driving wheels via the power transmitting system of the torque converter and a second clutch device operated during forward vehicle operation and configured to transmit the driving power of the engine to the driving wheels without the power transmitting system of the torque converter, and the clutch control device is configured to selectively operate the first clutch device and the second clutch device in accordance with the vehicle condition to position them in either the first power transmitting condition or the second power transmitting condition, it is possible to avoid complication and increases in size of the power transmitting apparatus, to improve the starting performance due to the torque amplifying function of the torque converter, and to improve the power transmitting efficiency during the steady running of a vehicle. In embodiments where the clutch control device is also configured to operate only the second clutch device when the engine is restarted by the engine control device after the idle-stopped condition, oil can be instantly and smoothly supplied to the second clutch device when the engine is restarted after the idle-stop.

In some embodiments wherein the power transmitting apparatus further comprises a first driving shaft connected to the first clutch device and configured to be rotated by the driving power of the engine via the power transmitting system of the torque converter, and a second driving shaft connected to the second clutch device and configured to be rotated by the driving power of the engine without the power transmitting system of the torque converter, and the first and second driving shafts are arranged coaxially with each other, it is possible to reduce the whole size of the power transmitting apparatus as compared with the size of a power transmitting apparatus in which the first and second driving shafts extend linearly from each other.

In some embodiments wherein the clutch mechanism comprises a forward-operation clutch device operated during forward vehicle operation and configured to transmit the driving power of the engine to the driving wheels via the power transmitting system of the torque converter and a lock-up clutch device configured to transmit the driving power of the engine to the driving wheels without the power transmitting system of the torque converter, and the clutch control device is configured to selectively operate the forward-operation clutch device and the lock-up clutch device in accordance with the vehicle condition to position them in either the first power transmitting condition or the second power transmitting condition, it is possible to easily apply such a power transmitting apparatus to a vehicle mounted with a lock-up clutch device being comparatively in wide use.

In some embodiments wherein an automatic variable speed unit is operatively positioned between the clutch mechanism and the driving wheels to transmit power from the engine to the driving wheels, it is possible to perform adjustments of the driving power and the operating conditions to obtain efficient fuel consumption.

In some embodiments wherein the automatic variable speed unit is a continuously variable transmission (CVT), it is possible to continuously perform adjustments of the driving power and the operating conditions to obtain efficient fuel consumption.

BRIEF DESCRIPTION OF THE DRAWINGS

FIG. 10 is a control mode table of a clutch control device of the power transmitting apparatus of FIG. 1.

DETAILED DESCRIPTION OF EXEMPLIFYING EMBODIMENTS

Figure 1:
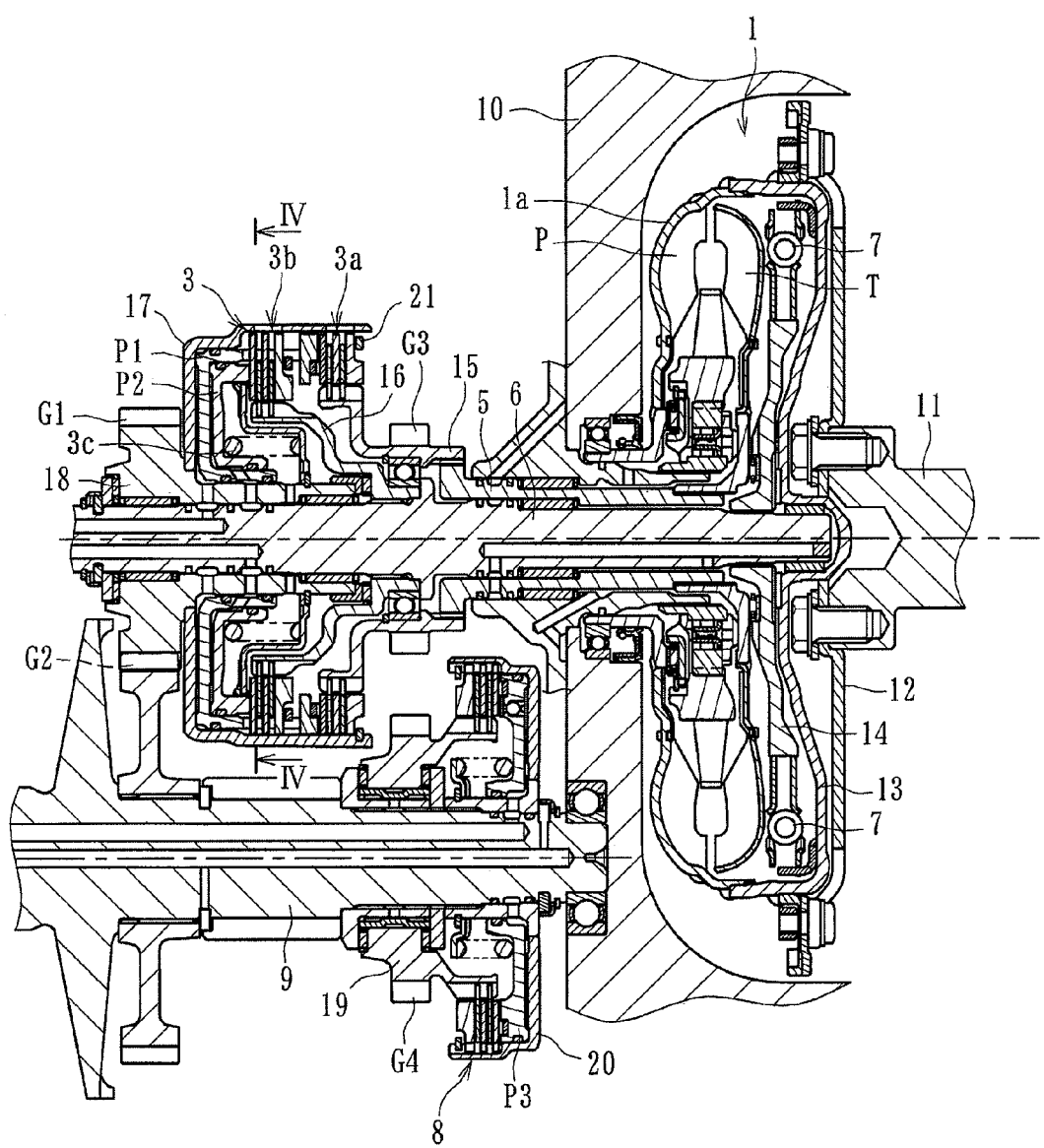
FIG. 1 is a longitudinal sectional view showing a power transmitting apparatus according to a first embodiment.

A first embodiment of a power transmitting apparatus can be configured to transmit or cut-off the driving force from an engine (driving source) of an automobile (vehicle) to or from the wheels (driving wheels). Such an apparatus can include, with reference to FIGS. 1 and 2, a torque converter 1, a clutch mechanism 3, an oil pump 31, a clutch control device 4, an engine control device 22, a flow control device 23, a first driving shaft 5, a second driving shaft 6, a damper mechanism 7, and a third clutch device 8. FIG. 1 is a longitudinal-section view showing a main part of the power transmitting apparatus of the first embodiment, and FIG. 2 is a schematic diagram of the power transmitting apparatus of FIG. 1.

Figure 2:
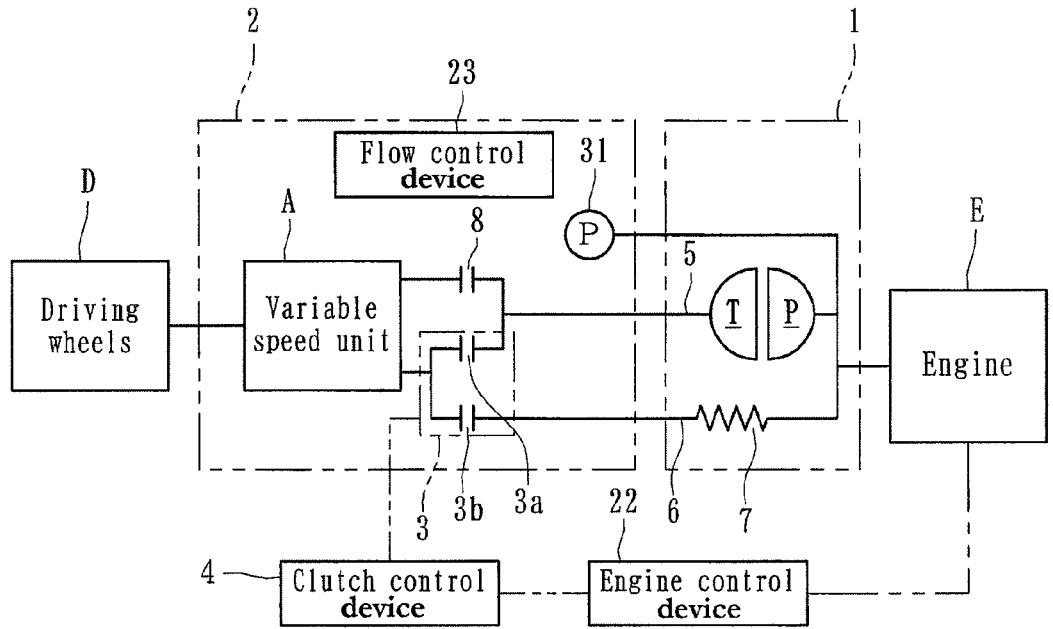
FIG. 2 is a schematic diagram of the power transmitting apparatus of FIG. 1.

As shown in FIG. 2, the torque converter 1 and a transmission 2 are configured to perform as a power transmitting system that transmits power from the engine E as the driving source of a vehicle to wheels (driving wheels D). The transmission 2 can include the clutch mechanism 3, the third clutch device 8, and the variable speed unit A. In FIG. 1 a reference numeral 11 denotes an input shaft extending from the engine E and a reference numeral 9 denotes an output shaft extending to the variable speed unit A.

The torque converter 1 can provide a torque amplifying function for amplifying the torque from the engine E and transmitting it to the transmission 2. The torque converter 1 is rotated around its shaft by the driving power transmitted from the engine E. The torque converter 1 can comprise torque converter covers 1a and 13 for containing oil (operating oil) in a fluid-tight manner. A pump P can be formed on the torque converter cover 1a and rotated together with the torque converter cover 1a. A turbine T can be arranged oppositely to the pump P and rotatable at a side of the torque converter cover 13.

The input shaft 11 can be connected to the torque converter cover 13 through a cover member 12. When the input shaft 11 is rotated by the driving power of the engine E, the cover member 12, the torque converter covers 13 and 1a, and the pump P are rotated. The rotational torque is thus transmitted to the turbine T through the oil (operating oil) with the torque being amplified. The turbine T is then rotated by the amplified torque and thus the amplified torque is transmitted to the transmission 2 through a first driving shaft 5 spline-fitted with the turbine T (first power transmitting condition). The term "power transmitting system of the torque converter" used herein means a power transmitting system formed by the torque converter cover 1a, the pump P, and turbine T. A reference numeral 10 in FIG. 1 denotes a transmission case.

On the other hand, the torque converter cover 13 can be connected to a connecting member 14 through the damper mechanism 7 comprising coil springs and the connecting member can be further spline-fitted with the outer circumferential surface of a second driving shaft 6. Accordingly, when the input shaft 11 is rotated by the driving power of the engine E, the cover member 12, the torque converter cover 13, the connecting member 14 and the second driving shaft 6 are rotated and thus the driving torque of the engine E is transmitted to the transmission 2. That is, the second driving shaft 6 can transmit the driving power to the transmission 2 without through the power transmitting system of the torque converter 1 (second power transmitting condition).

As described above, the first driving shaft 5 can be rotated by the driving power of the engine E through the power transmitting system of the torque converter 1 and can be connected to a first clutch device 3a, and the second driving shaft 6 can be directly rotated by the driving power of the engine E without through the power transmitting system of the converter 1 and can be connected to a second clutch device 3b. In addition, the first driving shaft 5 can be a hollow cylindrical member and the second driving shaft 6 can be rotationally arranged coaxially within the first driving shaft 5. Thus, the first driving shaft 5 can be rotatable around the second driving shaft 6 and, on the other hand, the second driving shaft 6 is rotatable within the first driving shaft 5. The first driving shaft 5 and the second driving shaft 6 can be independently rotated by properly selected operation of the clutch mechanism 3.

The clutch mechanism 3 can comprise the first clutch device 3a operable on advancement of an automobile (vehicle) and configured to transmit the driving power of the engine (driving source) E to the wheels (driving wheels D) through a power transmitting system of the torque converter 1 in a first power transmitting condition, and a second clutch device 3b configured to transmit the driving power of the engine E to the wheels D without through the power transmitting system of the torque converter 1 in a second power transmitting condition. The first and second clutch devices 3a and 3b respectively can comprise a plurality of driving clutch discs 3aa and 3ba and a plurality of driven clutch discs 3ab and 3bb slidable to right and left directions in drawings, and thus each form multiple disc clutches.

Figure 5:
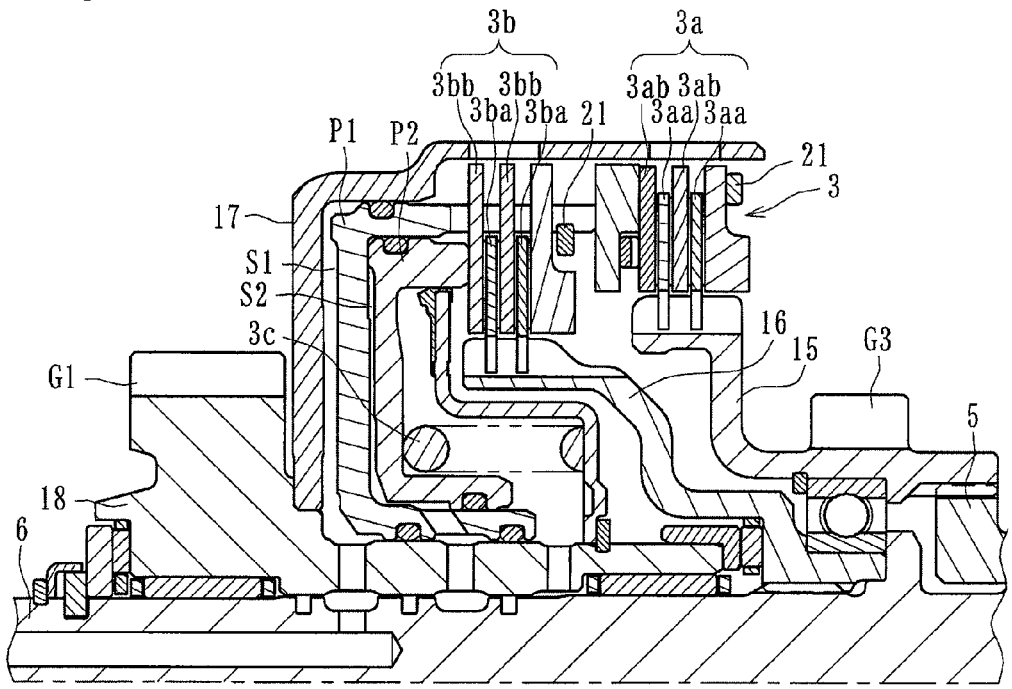
FIG. 5 is an enlarged view of the clutch mechanism of the power transmitting apparatus of FIG. 1 showing a condition in which only the first clutch device is activated.

In the first clutch device 3a, the driving clutch discs 3aa can be mounted on an interlocking member 15 connected to the first driving shaft 5 and interlocking therewith and the driven clutch discs 3ab can be mounted on a housing 17, and the driving clutch discs 3aa and the driven clutch discs 3ab can be alternately arranged with each other to form a laminated structure. These driving clutch discs 3aa and the driven clutch discs 3ab can be engaged and disengaged with each other. FIG. 5 shows a condition in which the first clutch device 3a is actuated and the driving clutch discs 3aa and the driven clutch discs 3ab are press-contacted with each other.

Figure 6:
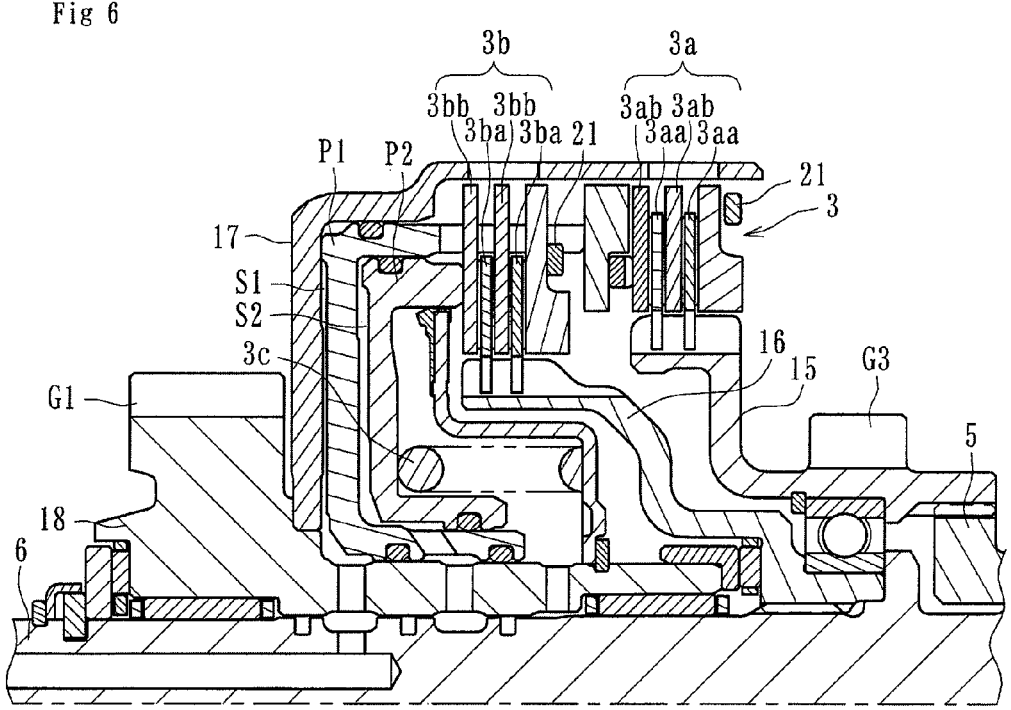
FIG. 6 is an enlarged view of the clutch mechanism of the power transmitting apparatus of FIG. 1 showing a condition in which only the second clutch device is activated.
Figure 7:
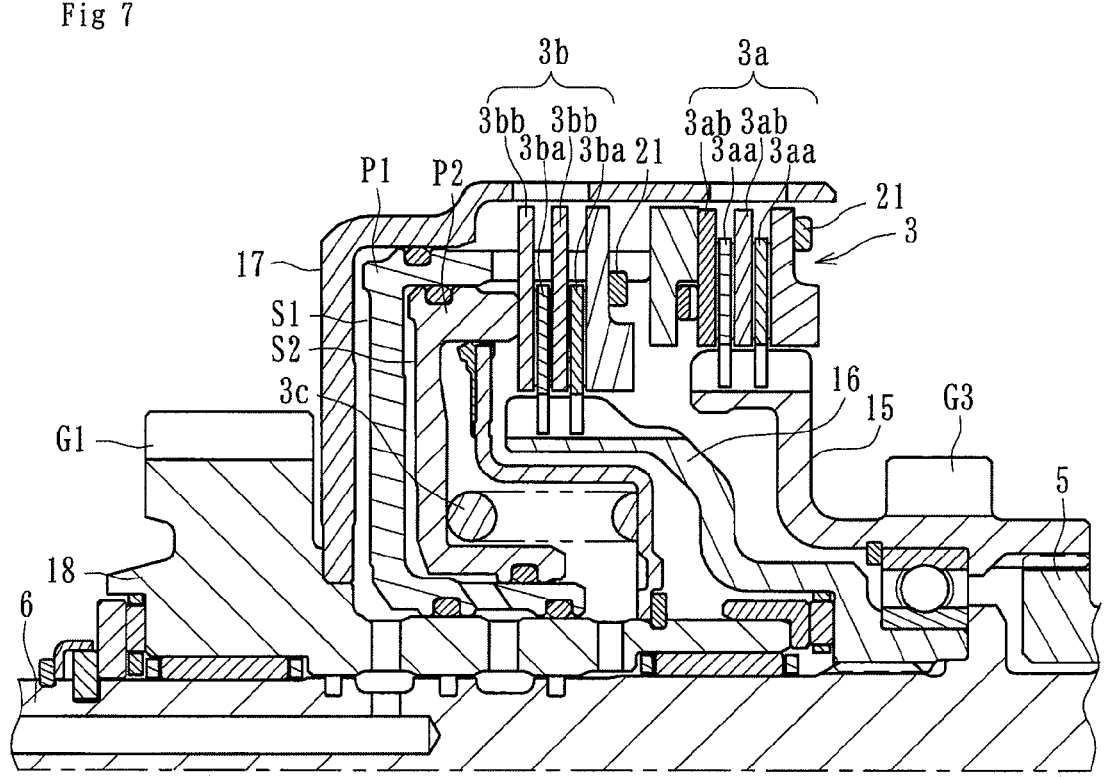
FIG. 7 is an enlarged view of the clutch mechanism of the power transmitting apparatus of FIG. 1 showing a condition in which both the first and second clutch devices are activated.

Meanwhile, in the second clutch device 3b, the driving clutch discs 3ba can be mounted on an interlocking member 16 connected to the second driving shaft 6 and interlocking therewith and the driven clutch discs 3bb can be mounted on the housing 17, and the driving clutch discs 3ba and the driven clutch discs 3bb can be alternately arranged with each other to form a laminated structure. These driving clutch discs 3ba and the driven clutch discs 3bb can be engaged and disengaged with each other. FIG. 6 shows a condition in which the second clutch device 3b is actuated and the driving clutch discs 3ba and the driven clutch discs 3bb are press-contacted with each other. The term "disengaged" used herein means a condition in which a pressure applied to the clutch discs is released while the clutch discs may remain in contact with each other, for example, while slipping. Thus, the term "disengaged" is not limited only to a physically disengaged condition. The transmission of driving power is allowed under the press-contacted condition and cut off under the disengaged condition.

Figure 3:
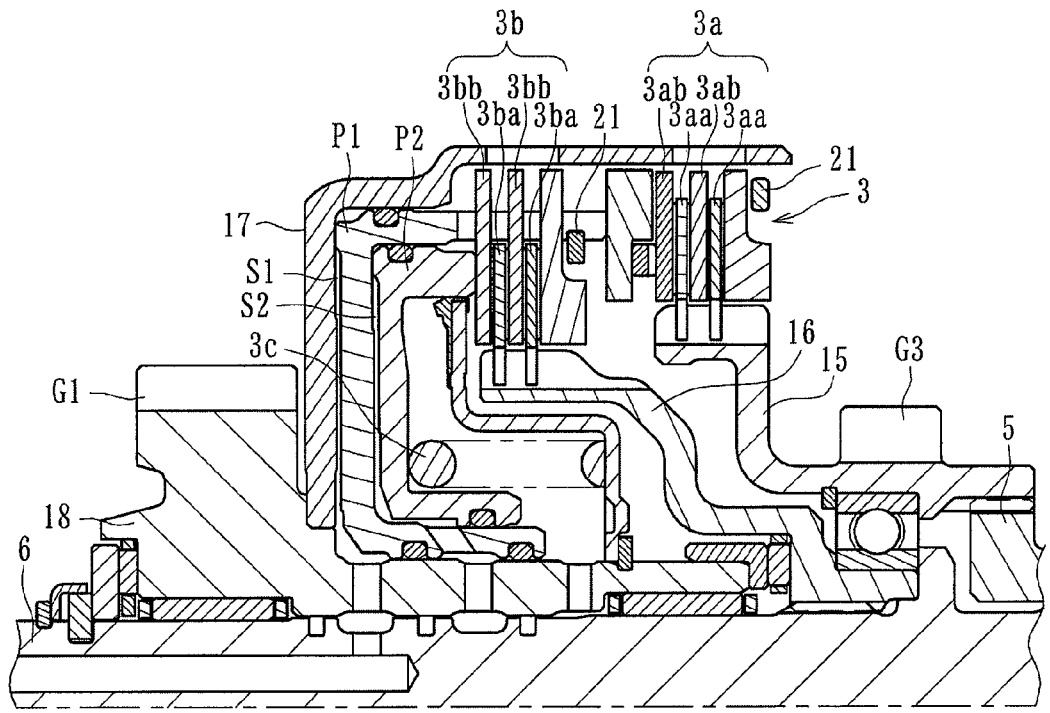
FIG. 3 is an enlarged cross-sectional view showing a clutch mechanism of the power transmitting apparatus of FIG. 1.

As shown in FIG. 3, the clutch mechanism 3 can comprise the first clutch device 3a, the second clutch device 3b, and two hydraulic pistons P1 and P2 corresponding respectively to the first and second clutch devices 3a and 3b contained in the same housing 17. The first and second clutch devices 3a and 3b can thus be selectively actuated by controlling the hydraulic pressure for actuating the hydraulic pistons P1 and P2.

Figure 4:
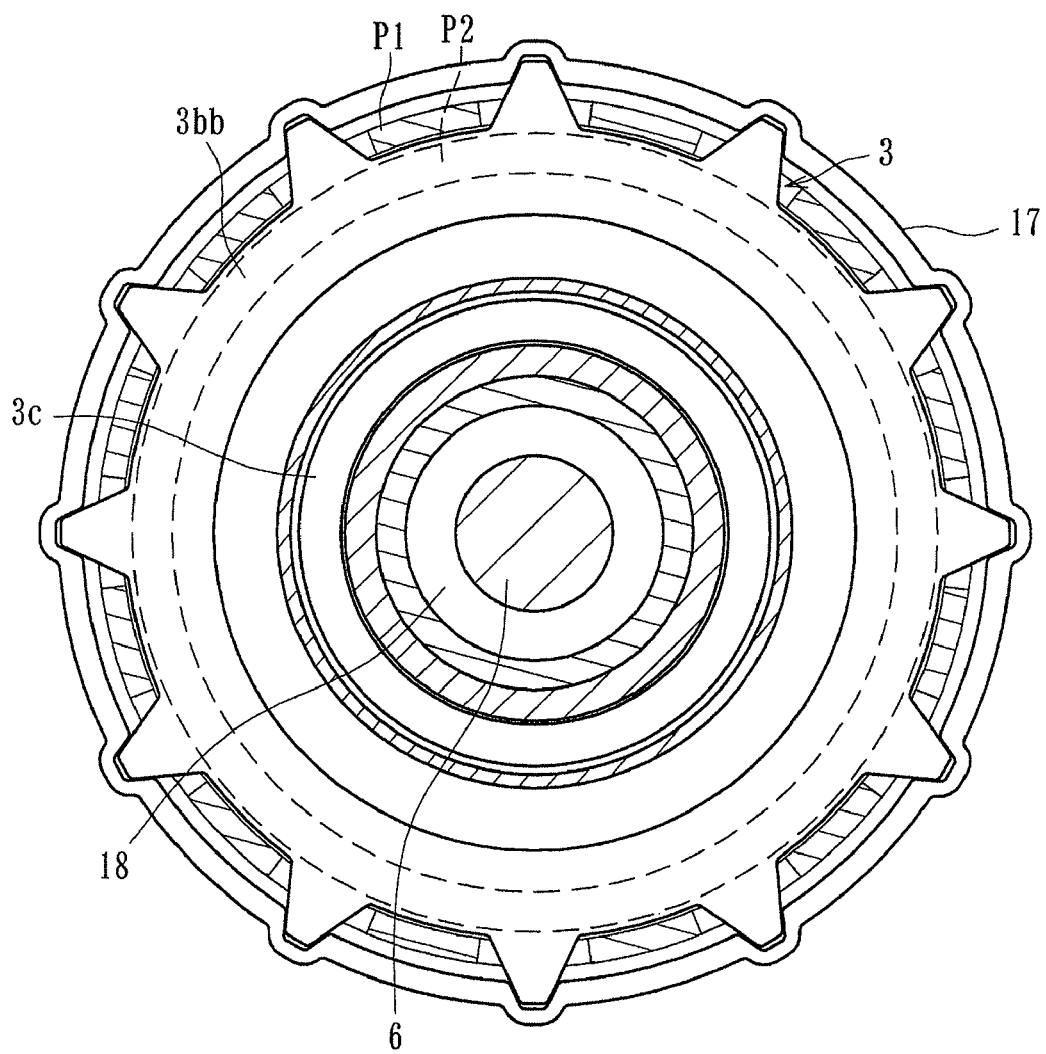
FIG. 4 is a cross-sectional view taken along a line IV-IV of FIG. 1.

For example, the hydraulic piston P1 can be moved toward the right in FIG. 3 against an urging force of a return spring 3c by supplying the operating oil into a hydraulic chamber S1 between the housing 17 and the hydraulic piston P1 and thus the first clutch device 3a is pressed by tips formed on the hydraulic piston P1 to press-contact the driving clutch discs 3aa and the driven clutch discs 3ab against each other. The tips formed on the hydraulic piston P1 can be passed through recesses formed on the peripheries of the driving clutch discs 3ba and the driven clutch discs 3bb of the second clutch device 3b as shown in FIG. 4.

The hydraulic piston P2 can be moved toward the right in FIG. 3 against an urging force of a return spring 3c by supplying the operating oil into a hydraulic chamber S2 between the hydraulic piston P1 and the hydraulic piston P2 and thus the second clutch device 3b is pressed by tips formed on the hydraulic piston P2 to press-contact the driving clutch discs 3ba and the driven clutch discs 3bb against each other. Thus the first clutch device 3a and the second clutch device 3b can be selectively actuated by controlling the hydraulic pressures operating the hydraulic pistons P1 and P2. In other words, the pistons P1 and P2 can change the first and second clutch devices between engaged and disengaged states. In FIG. 3 a reference numeral 21 denotes stoppers arranged at the sides of the first and second clutch devices 3a, 3b. Provision of the stopper 21 at the side of the second clutch 3b enables the second and first clutch devices 3b, 3a to be operated independently from each other.

The housing 17 forming part of the clutch mechanism 3 can be connected to an interlocking member 18 having formed thereon a gear G1 mating with a gear G2 formed on the output shaft 9. Thus, the driving power of the engine E transmitted through the first and second clutch devices 3a and 3b can be transmitted to the output shaft 9 through the housing 17 and the interlocking member 18.

The oil pump 31 can be driven by the driving power of the engine E to supply oil (operating oil) to the clutch mechanism 3 (first and second clutch devices 3a and 3b) and the torque converter 1 in order to operate the clutch mechanism 3 and the torque converter 1. The oil pump 31 can discharge oil using the driving power of the engine E and can be configured to be always operated during running of the engine E and stopped when the engine E is stopped.

The clutch control device 4 can be configured to selectively operate the hydraulic pistons P1, P2 by introducing operating oil into the hydraulic chambers S1, S2 in accordance with conditions (e.g. speed or inclination) of an automobile (a vehicle) to selectively operate the first clutch device 3a or the second clutch device 3b in order to transmit the driving power of the engine E to the driving wheels D via the power transmitting system of the torque converter 1 (first power transmitting condition) or without the power transmitting system of the torque converter 1 (second power transmitting condition).

On the other hand, the third clutch device 8 can comprise a multiple disc clutch and can be configured to transmit the driving power of the engine E to the driving wheels D via the power transmitting system of the torque converter 1 during reverse-direction operation of a vehicle. That is, the driving power of engine E can be transmitted to the third clutch device 8 with a gear G3 formed on an interlocking member 15 mated with a gear G4 formed on an interlocking member 19 of a side of output shaft 9 via an idle gear (not shown) arranged between them when a shift lever (not shown) of a vehicle is shifted to the "R" range (reverse position).

Similar to the first and second clutch devices 3a, 3b, the third clutch device 8 can have a housing 20 connected to the output shaft 9 and interlocked therewith. A hydraulic piston P3 and alternately arranged driving clutch discs 8a and driven clutch discs 8*b* can be arranged within the housing 20 so that mutually adjacent driving clutch discs 8*a* and driven clutch discs 8*b* are engaged and disengaged with each other by actuation of the hydraulic piston P3.

The engine control device 22 can be formed, for example, within an ECU (not shown) for controlling the engine E and can be configured to automatically stop the engine E to have an "idle-stop" condition when the speed of a vehicle is reduced below a predetermined value (e.g. a vehicle has reached a speed between a speed just before stop and a full stop) and to restart the engine E when a brake operation is released or an accelerator pedal is depressed. The engine control device 22 can be dedicated to control of the engine E relating to the idle-stop operation while the ECU generally controls operations of the engine E. In some embodiments, the engine E can be restarted after the idle-stop in other additional or different conditions, such as an increase of the vehicle speed etc. for example.

Where the power transmitting apparatus comprises the clutch control device 4 for transmitting the driving power of the engine E to the driving wheels D through the power transmitting system of the torque converter 1 or for transmitting the driving power of the engine E to the driving wheels D without the power transmitting system of the torque converter with proper selected operation of the first clutch device 3*a* or the second clutch device 3*b* in accordance with conditions of the vehicle, it is possible to avoid complication and increases in size of the apparatus, to improve the starting performance using the torque amplifying function of a torque converter, and to improve the power transmitting efficiency during steady running of a vehicle. Accordingly, in some embodiments it is possible to eliminate a lock-up clutch of the prior art.

Furthermore, since the first driving shaft 5 and the second driving shaft 6 are arranged coaxially with each other, it is possible to reduce a whole size of the power transmitting apparatus as compared with a configuration in which they are separately and linearly extended as in the prior art. In addition, since the second driving shaft 6 is connected to the engine E through a damper mechanism 7 for damping torque variation, it is possible to damp vibration of the engine E transmitted to the second clutch device 3*b*.

In addition, since the clutch mechanism 3 is configured so that the first and second clutch devices 3*a*, 3*b* and two hydraulic pistons P1, P2 corresponding to the first and second clutch devices 3*a*, 3*b* are contained within the same housing 17 and that the first and second clutch devices 3*a*, 3*b* can be selectively operated by controlling the hydraulic pistons P1, P2, it is possible to further reduce the size and simplify the structure of whole the power transmitting apparatus.

Figure 8:
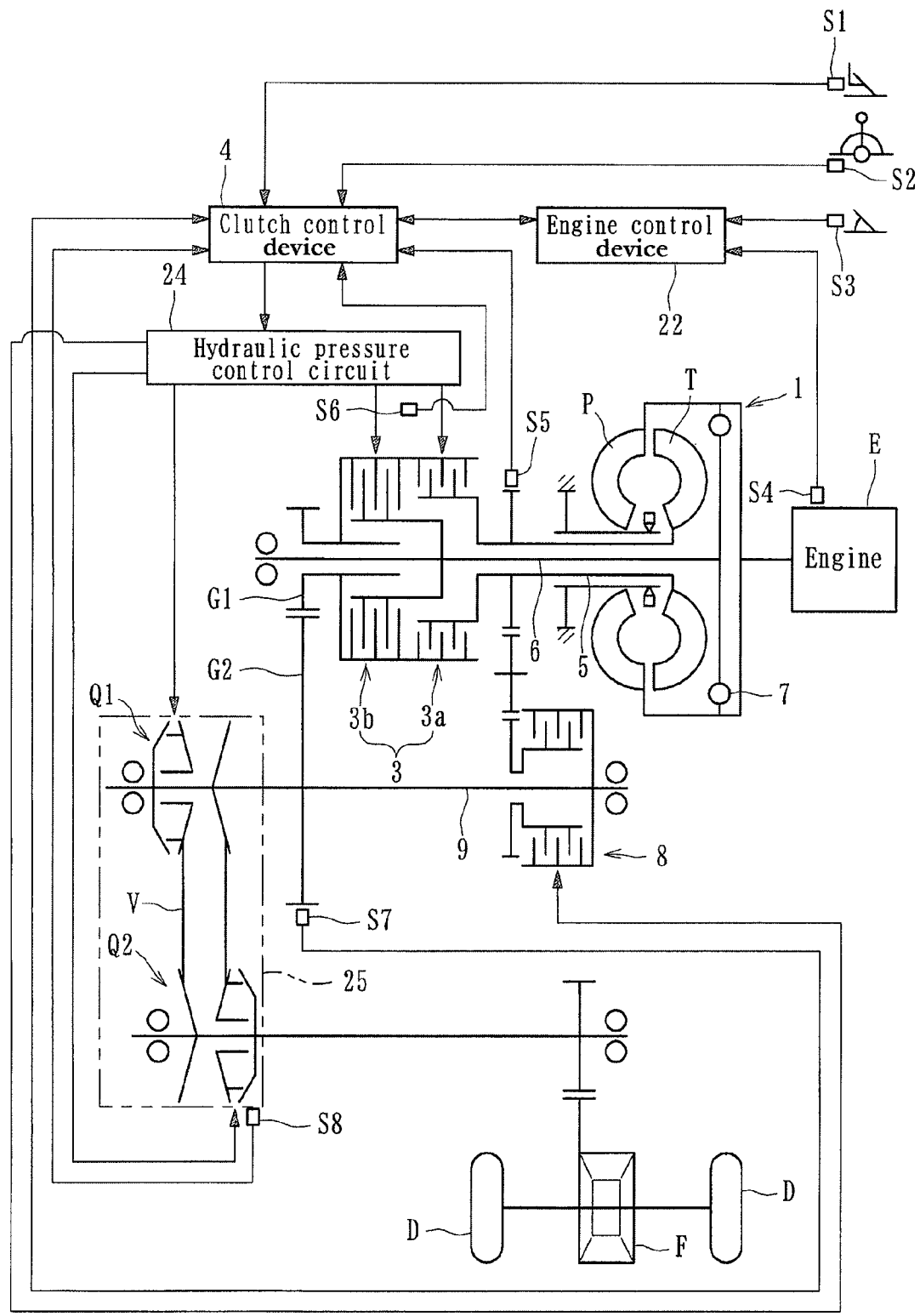
FIG. 8 is a schematic diagram of a power transmitting apparatus including a variable speed unit A (CVT 25).

The variable speed unit A can be a continuously variable transmission (CVT) 25. More particularly, as shown in FIG. 8, the CVT 25 can be operatively positioned between the second clutch device 3*b* of the clutch mechanism 3 and the driving wheels D in the power transmitting system to transmit power from the engine E to the driving wheels D.

Such a CVT 25 can comprise two pulleys Q1, Q2 and a belt V extending therebetween and can achieve a desired speed by independently shifting movable sheaves and changing diameters of the pulleys Q1, Q2 on which the belt V runs by a hydraulic pressure control circuit 24. The clutch control device 4 can be electrically connected with a brake switch 51, a position sensor S2 and engine control device 22 etc. The CVT 25 can be controlled by the clutch control device 4 via the hydraulic pressure control circuit 24. A reference character S3 denotes a throttle opening sensor of the accelerator pedal.

Since the CVT 25 is operatively positioned between the second clutch device 3*b* of the clutch mechanism 3 and the driving wheels D in the power transmitting system to transmit power from the engine E of the vehicle to the driving wheels D, a clutch used for advancing a vehicle and a clutch for transmitting the driving power of the engine E to the driving wheels D without the power transmitting system of the torque converter 1 can be combined in the second clutch device 3*b*. A reference character F denotes a differential gear of a vehicle. A reference character S4 denotes an engine speed sensor configured to detect the rotational speed of the engine E. A reference character S5 denotes a speed sensor configured to detect the rotational speed of the first driving shaft 5. A reference character S6 denotes a oil pressure switch configured to detect the hydraulic pressure of the clutch mechanism 3 (the second clutch device 3*b* in this embodiment). A reference character S7 denotes a secondary shaft speed sensor. A reference character S8 denotes a counter shaft speed sensor.

Figure 9:
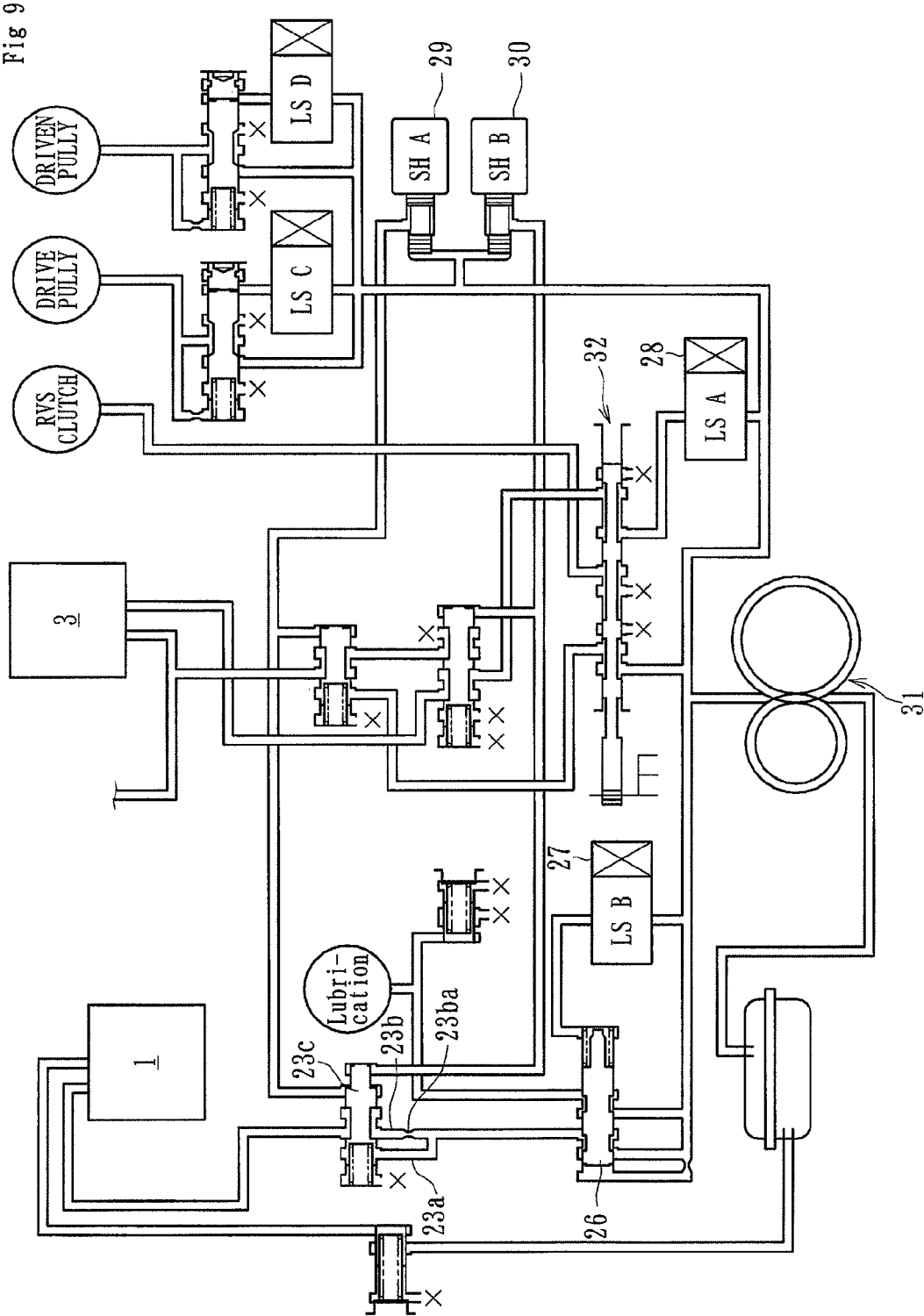
FIG. 9 is a block diagram showing a hydraulic pressure control circuit of the power transmitting apparatus of FIG. 1.

As shown in FIG. 9, the hydraulic pressure control circuit 24 can comprise oil paths and valves connecting the oil pump 31 and objects to be supplied with oil (e.g. the torque converter 1, the clutch mechanism 3, etc.) and solenoids for opening and closing the valves. A reference numeral 26 denotes a regulator valve for controlling the line pressure. A reference numeral 27 denotes a linear solenoid (LS B) for controlling the pressure of the regulator 26. A reference numeral 28 denotes a linear solenoid (LS A) for controlling the clutch pressure. A reference numeral 32 denotes a manual valve for switching the oil paths in accordance with the shift ranges (P, R, N, D) of the variable speed unit. The linear solenoid (LS A) 28 can control the clutch pressure for the clutch mechanism 3 in the D range and the clutch pressure for a "RVS CLUTCH" in the R range. The linear solenoid (LS B) 27 can control the line pressure controlled by the regular valve.

As shown in this embodiment, a flow control device 23 can be positioned in an oil path from the oil pump 31 to the torque converter 1. The flow control device 23 can be configured to limit the supply of oil (operating oil) to the torque converter 1 by the oil pump 31 and to prioritize the supply of oil to the clutch mechanism 3 when the engine E is restarted by the engine control device 22 after the idle-stop.

More particularly, the flow control device 23 can comprise a hydraulic valve mechanism having a first supply path 23*a* for normally supplying oil to the torque converter 1, a second supply path 23*b* in which an orifice 23*ba* for limiting the supply of oil is formed, and a valve 23*c* for opening and closing the first supply path 23*a* by hydraulic pressure. The valve 23*c* can be opened and closed by a solenoid (SH A) 29 and a solenoid (SH B) 30. The valve 23*c* of the flow control device 23 of this embodiment can be normally urged by a spring in a direction that would close the first supply path 23*a*. Although in this embodiment the oil supply to the torque converter 1 by the oil pump 31 is limited by the flow control device 23 when the engine E is restarted by the engine control device 22 after the idle-stop, the supply of oil to the clutch mechanism 3 can be prioritized by preventing supply of any oil to the torque converter 1.

As shown in FIG. 10, the clutch control device 4 can be configured so that the hydraulic pressure valve mechanism forming the flow control device 23 can be selectively operated by controlling the solenoid (SH A) 29 and the solenoid (SH B) 30 in accordance with set modes. In FIG. 10 marks "○" denote that the solenoid is electrically "ON" and marks "x" denote that solenoid is electrically "OFF." In addition, a term "Line Pressure" denotes that the line pressure is directly inputted to the clutch mechanism 3 and a term "Linear solenoid A" denotes that the linear solenoid valve (LS A) 28 controls the clutch pressure.

Figure 11:
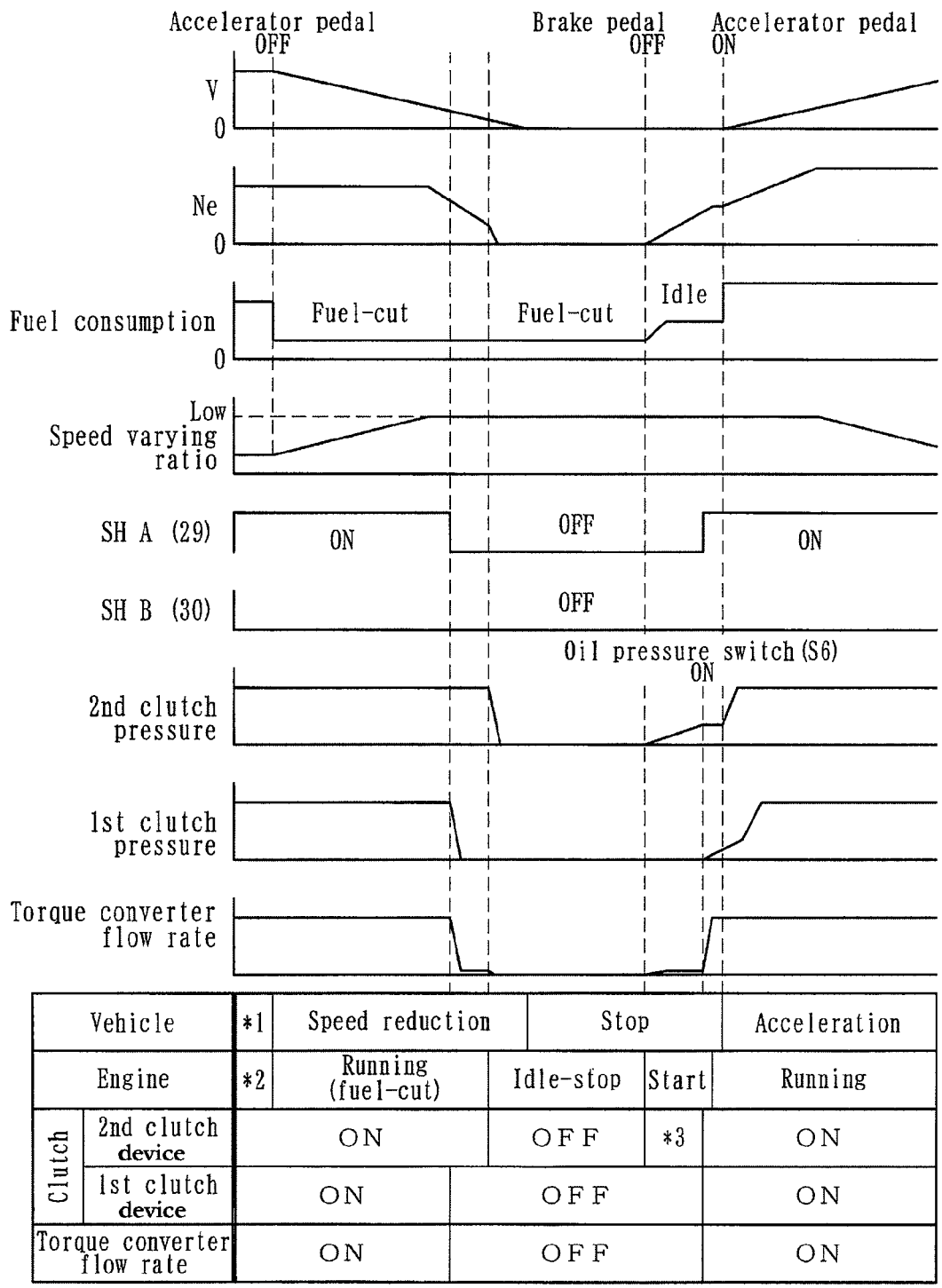
FIG. 11 is a time chart of the power transmitting apparatus of FIG. 1.

FIG. 11 is a time chart illustrating control by the clutch control device 4 in speed reduction, stop, and acceleration processes. This time chart indicates that the supply of oil to the clutch mechanism 3 is prioritized by limiting supply of oil by the oil pump 31 to the torque converter 1 through "ON/OFF" control of the solenoid (SHA) 29 and solenoid (SHB) 30 to actuate the flow control device 23 when the engine E is restarted after the idle-stop.

The condition in which the oil supply to the torque converter 1 by the oil pump 31 is limited (or prevented) by the flow control device 23 can be cancelled when the oil pressure switch S6 detects a set hydraulic pressure and the supply of oil to the torque converter 1 by the oil pump 31 then can be returned to the ordinary condition (i.e. condition in which the first supply path 23a is opened). In this case the oil pressure switch S6 forms a detecting device configured to detect whether or not the clutch mechanism 3 (second clutch device 3b in this embodiment) has attained a state capable of transmitting power by detecting the hydraulic pressure applied to the clutch mechanism 3.

Some embodiments, such as the present embodiment, can comprise a detecting device (oil pressure switch S6) configured to detect whether or not the clutch mechanism 3 (second clutch device 3b in this embodiment) has attained a state capable of transmitting power and the limitation (or prevention) of oil supply by the flow control device 23 can be cancelled after detection of the state capable of transmitting power by the detecting device (oil pressure switch S6). The detecting device is not limited to the oil pressure switch S6 and can be a hydraulic pressure sensor or any other means for detecting whether or not the clutch mechanism 3 has attained a state capable of transmitting power, e.g. such as those for measuring a lapsed duration of time from an engine restart and detecting a state capable of transmitting power from the elapsed time duration, for detecting the engine speed and detecting a state capable of transmitting power from the engine speed, or for calculating a slippage ratio of the second clutch device 3b and detecting a state capable of transmitting power from the slippage ratio.

As described above, since the limitation (or prevention) of oil supply by the flow control device 23 can be cancelled after the detection of a state capable of transmitting power by the detecting device, it is possible to instantaneously and smoothly supply oil to the clutch mechanism 3 and to exert to the maximum the torque amplifying function of the torque converter 1 at the start of movement of a vehicle from a stop. In addition, according to this embodiment, only the second clutch device 3b can be actuated immediately after the restart of engine after the idle-stop and the first clutch device 3a can be actuated after detection of a state capable of transmitting power by the detecting device (oil pressure switch S6). Thus, oil can be more instantaneously and smoothly supplied to the second clutch device 3b as compared with a structure in which oil is supplied to both the first and second clutch devices 3a and 3b on the restart of the engine after the idle-stop.

Furthermore, as in this embodiment, the engine control device 22 can be configured to automatically restart the engine E when a predetermined duration of time of the idle-stop condition has lapsed irrespectively of depression of the accelerator pedal. Thus, excessive introduction of air into the torque converter 1 or the hydraulic pressure control circuit 24 due to lapse of time over the predetermined time of the idle-stopped condition can be prevented and, thus, a driving response of the restart of engine after the idle-stop can be prevented from worsening.

Figure 12:
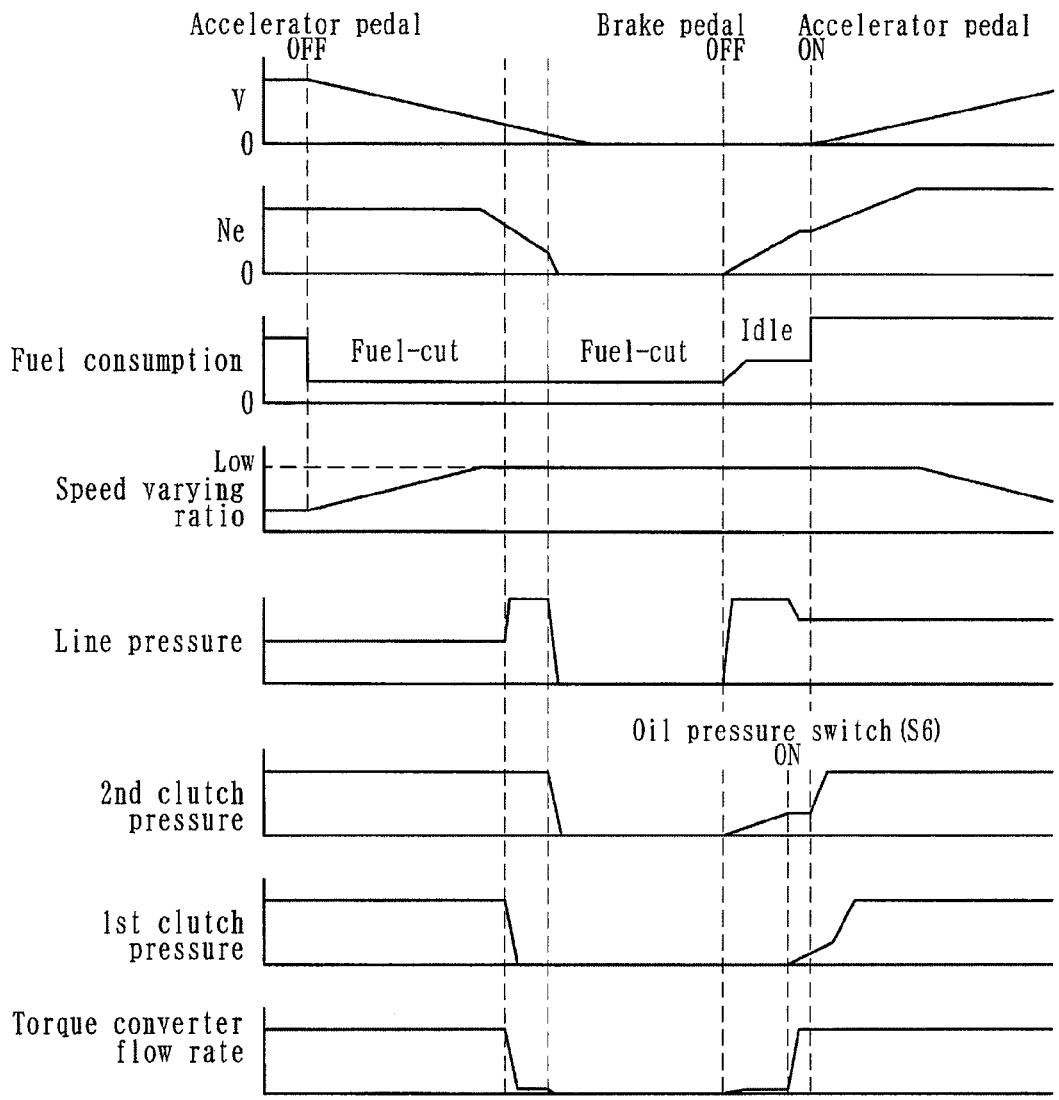
FIG. 12 is another time chart of the power transmitting apparatus of FIG. 1.

Instead of using the flow control device 23, a line pressure regulated by the regulator valve 26 can be increased as shown in FIG. 12 by controlling the linear solenoid valve (LS B) 27 on the restart of the engine after the idle-stop. Also, in this case it is preferable to control the regulator valve 26 (see line pressure setting illustrated in FIG. 12) so that the line pressure is returned to an ordinary value after the detection of a state capable of transmitting power by the detecting device (oil pressure switch S6).

Figure 13:
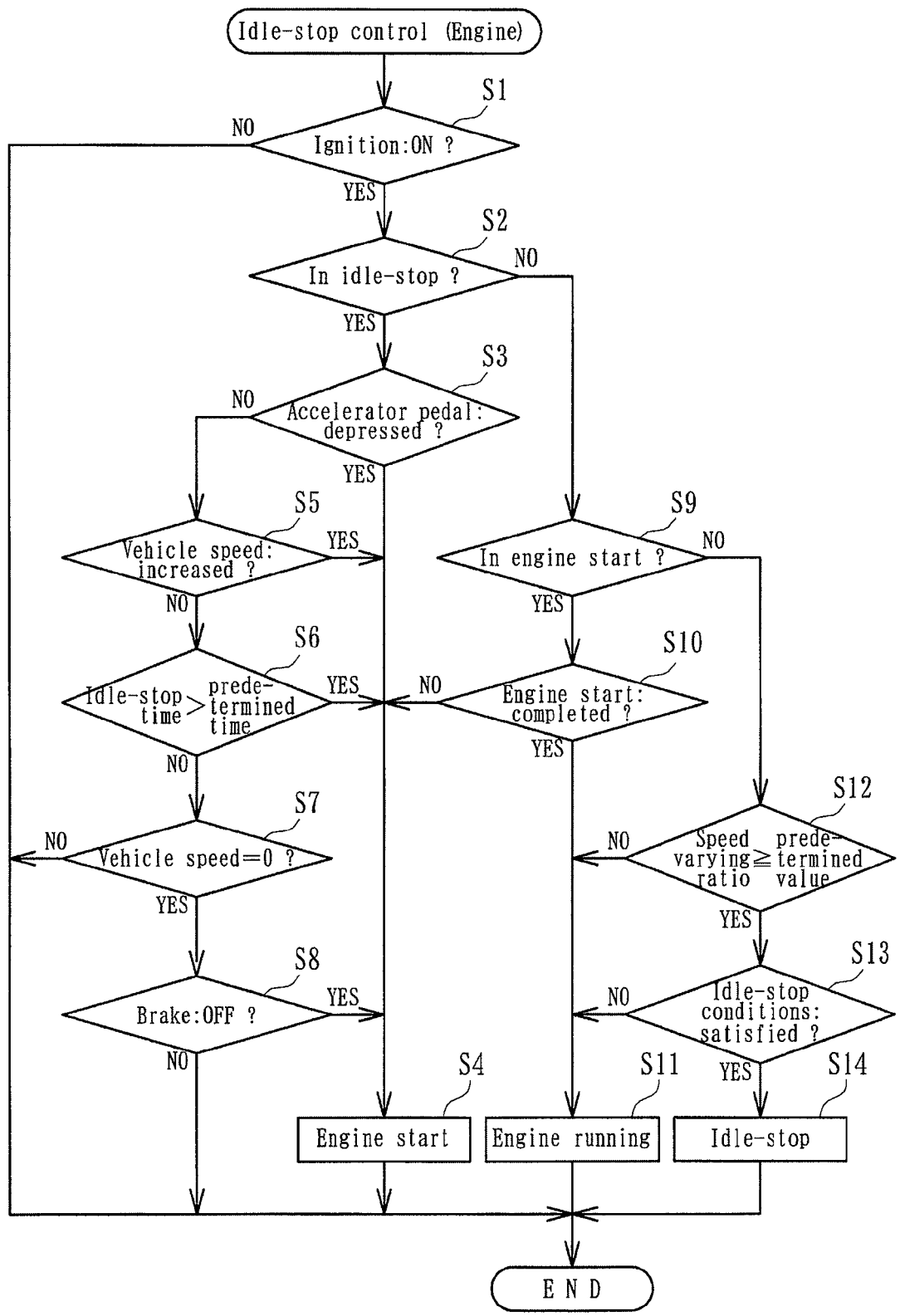
FIG. 13 is a flowchart illustrating a control routine of an engine control device of the power transmitting apparatus of FIG. 1.

A control method of the engine control device 22 is described with reference to a flowchart shown in FIG. 13. At S1, it is determined whether or not the ignition is "ON." If "ON", the method proceeds to S2 and determines whether or not it is in idle-stop. If determined to be in idle-stop, it is determined in S3 whether or not the accelerator pedal is depressed. If determined to be depressed, the method proceeds to S4 and the engine is restarted.

On the other hand, if determined in S3 that the accelerator pedal is not depressed yet, the method goes to S5 and determines whether the vehicle speed has been increased. If the vehicle speed has been increased, the method goes to S4 and the engine is restarted. On the contrary, if the vehicle speed has not been increased, the method goes to S6 and determines whether a predetermined duration of the idle-stop has lapsed. If the predetermined duration of the idle-stop has lapsed in S6, the method goes to S4 and the engine is restarted. On the contrary, if the predetermined duration of the idle-stop has not lapsed, the method goes to S7 and determines whether the vehicle speed is "0" (i.e. stopped) or not. If determined in S7 that the vehicle speed is "0", the method goes to S8 and determines whether the brake is "OFF" or not. If the brake is "OFF", the method goes to S4 and the engine is restarted.

If it is determined in S2 that it is not in idle-stop, the method goes to S9 and determines whether it is in the restart of the engine or not. If it is determined that it is in the restart of the engine, the method goes to S10 and determines whether the restart of the engine has been completed. If it is determined that the restart of the engine has been completed, the method goes to S11 and engine operation (engine running or engine driving) is performed. On the contrary, if it is determined that the restart of the engine has not been completed, the method goes to S4 and the engine is restarted.

If it is determined in S9 that it is not in the restart of the engine (i.e. in engine running), the method goes to S12 and determines whether or not the transmission ratio (effective gear ratio) of the continuously variable transmission (CVT) 25 is a predetermined value or greater value. If determined that the transmission ratio of the CVT 25 is a predetermined value or greater value, the method goes to S13 and determines whether that the idle-stop conditions (e.g. the vehicle speed is a predetermined value or less, the temperatures of water and oil are predetermined values or more, no trouble, etc.) are satisfied or not. If the transmission ratio of the CVT 25 is not a predetermined value or greater value, the method goes to S11 and the engine operation (engine running or engine driving) is performed. If it is determined in S13 that the idle-stop conditions are satisfied, the method goes to S14 and the idle-stop condition is implemented.

Figure 14:
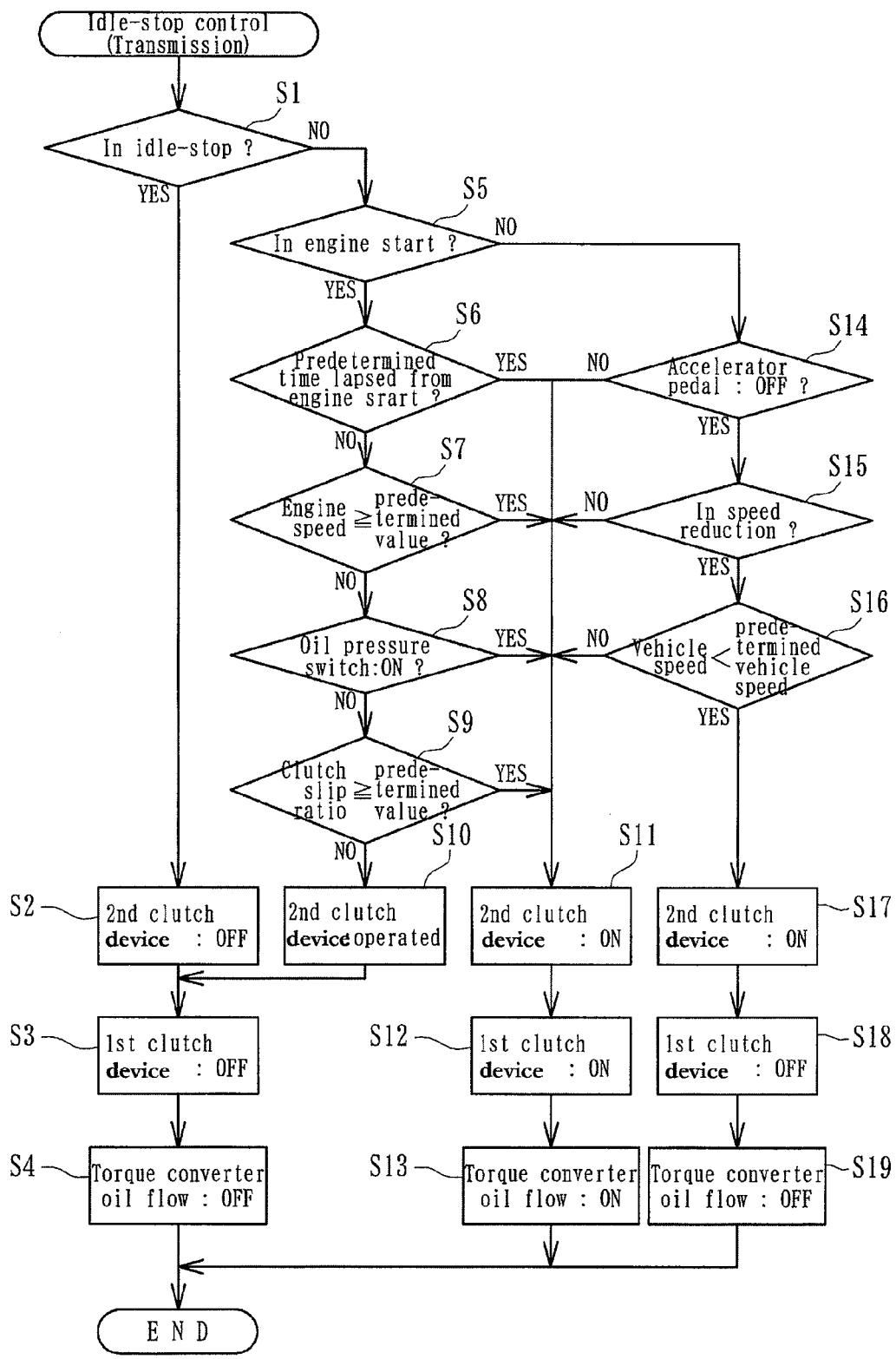
FIG. 14 is a flowchart illustrating a control routine of a clutch control device of the power transmitting apparatus of FIG. 1.

A control method of the clutch control device 4 is described with reference to a flowchart shown in FIG. 14.

First, it is determined in S1 whether the engine is in the idle-stop or not. If it is in the idle-stop, the second clutch device 3b is made "OFF" (S2), the first clutch device 3a is made "OFF" (S3), and the supply of oil to the torque converter 1 is also made "OFF" (S4). On the contrary, if it is determined in S1 that the engine is not in the idle-stop, the method goes to S5 and determined whether it is in the restart of the engine or not. If it is in the restart of the engine, the method goes to S6 and determined whether a predetermined time has lapsed from the restart of the engine.

If it is determined in S6 that the predetermined time has not lapsed from the restart of the engine, the method goes to S7 and determines whether or not the engine speed is a predetermined value or greater value. If the engine speed is not the predetermined value or greater value, the method goes to S8 and determines whether the oil pressure switch S6 (detecting device) is "ON" or not. If the oil pressure switch S6 is not "ON", the method goes to S9 and determines whether or not the clutch slip ratio is a predetermined value or greater value. If the clutch slip ratio is not the predetermined value or greater value, the method goes to S10 and actuates the second clutch device 3*b*. After the second clutch device 3*b* is actuated in S10, the method goes to S3 and S4.

On the contrary, if it is determined in S6 that the predetermined time has lapsed from the restart of the engine, or if it is determined in S7 that the engine speed is the predetermined value or greater value, or if it is determined in S8 that the oil pressure switch S6 (detecting device) is "ON", or if it is determined in S9 that the clutch slip ratio is a predetermined value or greater value, the method goes to S11 and actuates the second clutch device 3*b*. Then after it actuates the first clutch device 3*a* in 512, supply of hydraulic oil to the torque converter 1 is made "ON" in S13.

If it is determined in S5 that it is not in the restart of the engine (i.e. in engine running), the method goes to S14 and determines whether the accelerator pedal is "OFF" or not. If the accelerator pedal is "OFF", the method goes to S15 and determines whether it is in speed reduction or not. If it is determined in step S15 that it is in the speed reduction, the method goes to S16 and determines whether the vehicle speed is slower than a predetermined value or not. If the vehicle speed is lower than the predetermined value, the second clutch device 3*b* is made "ON" in S17, the first clutch device 3*a* is made "OFF" in S18, and the supply of operating oil to the torque converter 1 is made "OFF" in S19. In addition, if it is determined in S14 that the accelerator pedal is not "OFF" (i.e. is "ON"), in S15 that it is not in the speed reduction, and in S16 that the vehicle speed is not lower (i.e. is higher) than the predetermined value, it goes to S11 and then S12 and S13 after the second clutch device 3*b* has been actuated.

Where, as in the present embodiment, the oil supply to the torque converter 1 by the oil pump 31 is limited or prevented and the oil supply to the clutch mechanism 3 (second clutch device 3*b* in this embodiment) is prioritized when the engine control device 22 restarts the engine E after the idle-stop, it is possible in a power transmitting apparatus for a vehicle mounted with a torque converter 1 to perform instantaneous and sufficient oil supply to the clutch mechanism 3 on restart of the engine E after the idle-stop and, thus, to eliminate the electrically-driven oil pump and to reduce the manufacturing cost of the power transmitting apparatus.

In addition, where the flow control device 23 comprises a hydraulic valve mechanism having a first supply path 23*a* for normally supplying oil to the torque converter, a second supply path 23*b* for limiting or preventing the supply of oil, and a valve 23*c* for opening and closing the first supply path 23*a* by hydraulic pressure, it is possible to instantly and smoothly switch between the conditions of limiting or preventing the supply of oil to the torque converter 1 and of not limiting or preventing the supply of oil to the torque converter 1. Furthermore, where the valve 23*c* is normally urged by a spring in a direction for opening the second supply path 23*b* and closing the first supply path 23*a*, the supply of oil to the torque converter 1 can be reliably limited or prevented regardless of the operating response of the valve 23*c* on restart of the engine after the idle-stop.

A second embodiment of a power transmitting apparatus, like the first embodiment, can be configured to transmit or cut-off the driving force from an engine (driving source) of an automobile (vehicle) to or from the wheels (driving wheels). Such an apparatus can include, with reference to FIGS. 1 and 2, a torque converter 1, a clutch mechanism 3, an oil pump 31, a clutch control device 4, a engine control device 22, a flow control device 23, a first driving shaft 5, a second driving shaft 6, a damper mechanism 7, and a third clutch device 8. The same reference numerals are used to designate structural elements in this embodiment as those used to designate similar structural elements in the first embodiment and therefore detailed description of them is not repeated.

Figure 15:
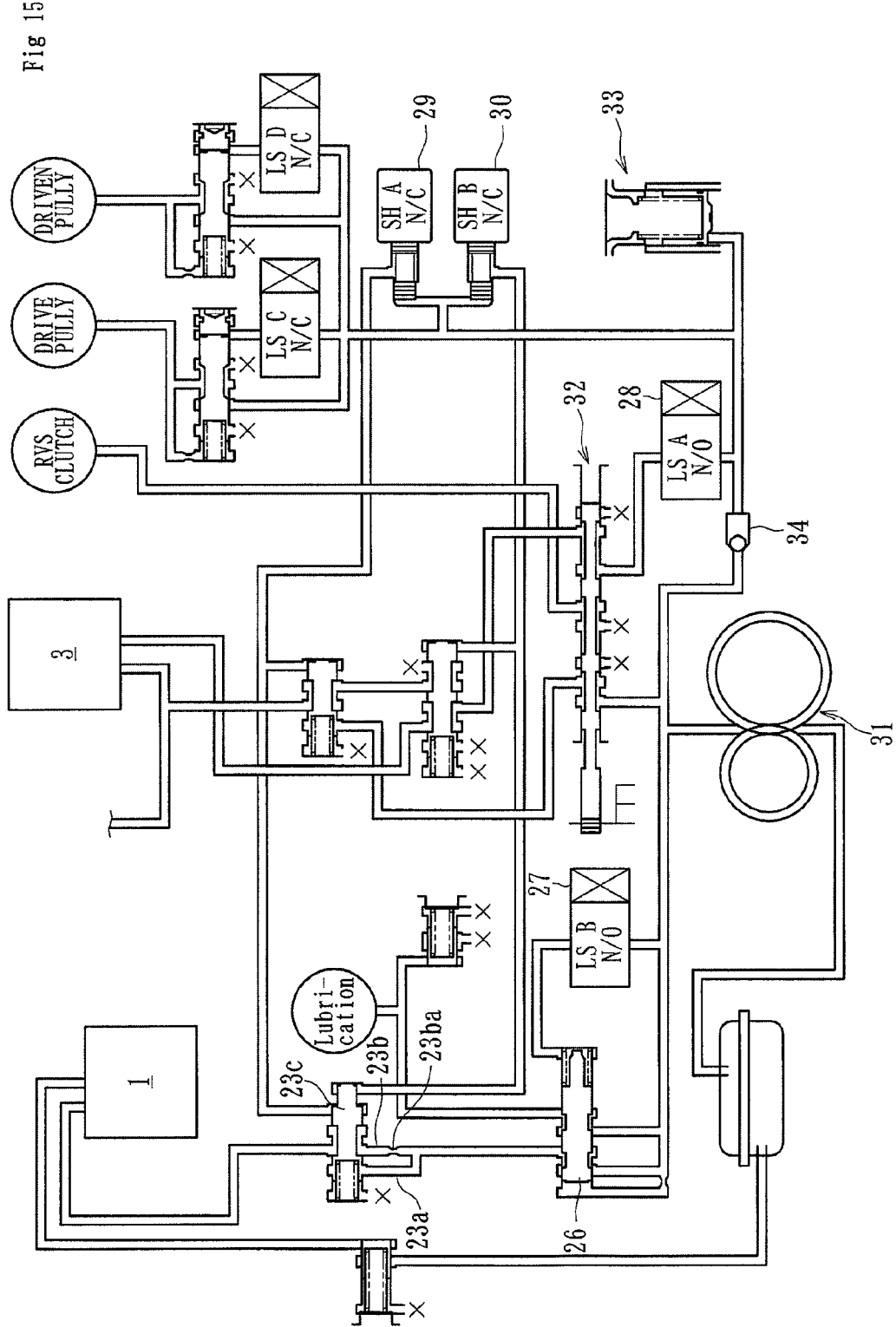
FIG. 15 is a block diagram showing a hydraulic pressure control circuit of a power transmitting apparatus of a second embodiment.

In this second embodiment, an accumulator 33 can be operatively positioned on an oil supply path of the clutch mechanism 3 from the oil pump 31 as shown in FIG. 15. The accumulator 33 can be configured to accumulate the oil and can be configured so that the oil accumulated in the accumulator 33 is discharged therefrom to the clutch mechanism 3 when the engine E is restarted by the engine control device 22 after the idle-stop. The provision of the accumulator 33 enables the oil supply to the clutch mechanism 3 on the restart of the engine after the idle-stop to be more instantaneous and smooth. A reference numeral 34 in FIG. 15 denotes a check valve.

Figure 16:
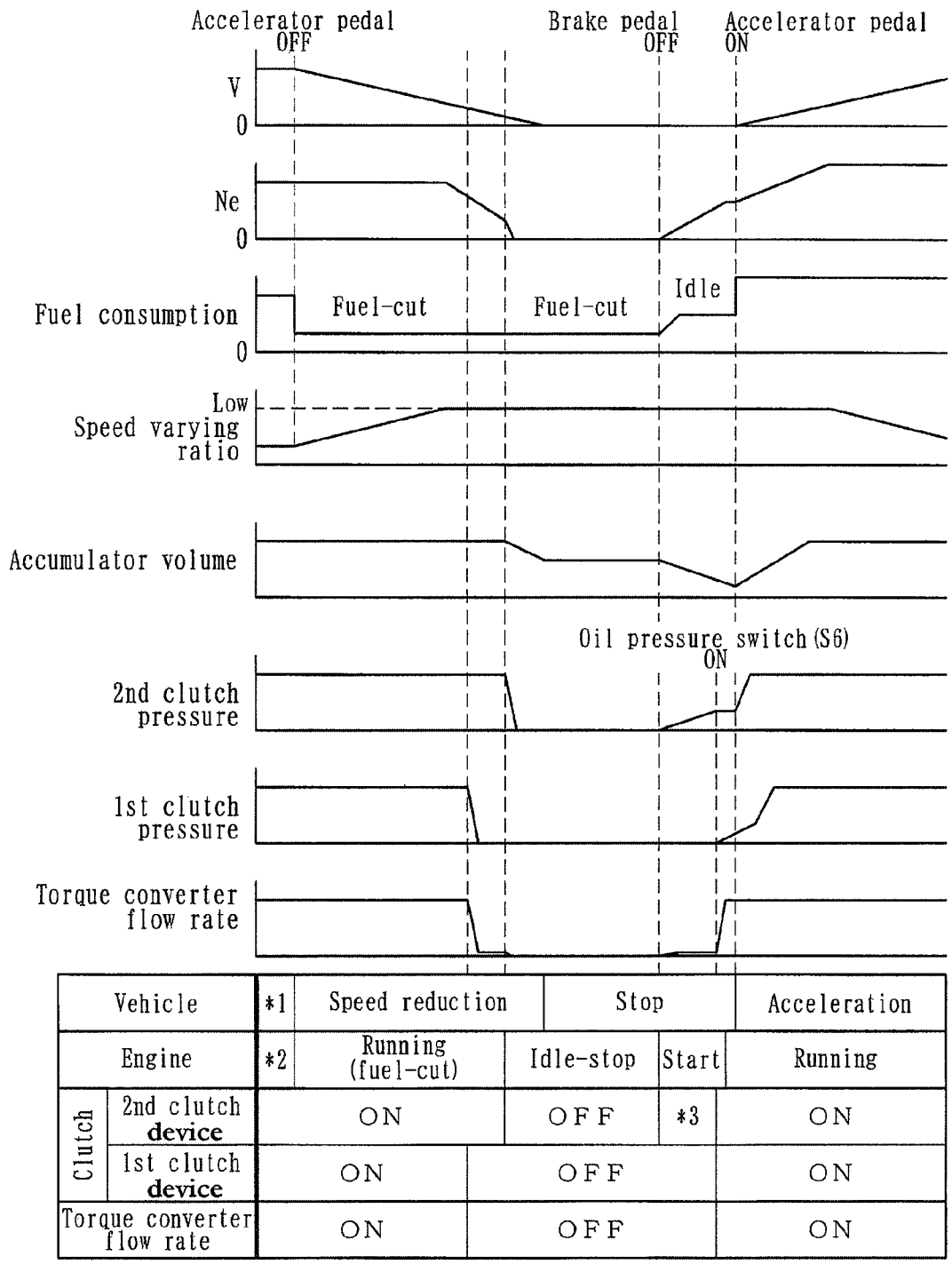
FIG. 16 is a time chart of the power transmitting apparatus of FIG. 15.

The controls of the clutch control device 4 in the processes of speed reduction, stoppage and acceleration of a vehicle are illustrated in a time chart of FIG. 16. Similar to the first embodiment, this time chart indicates that the supply of oil to the clutch mechanism 3 can be prioritized by actuating the flow control device 23 through ON/OFF control of the solenoid (SH A) 29 and the solenoid (SH B) 30 and limiting the oil supply rate by the oil pump 31 to the torque converter 1 on restart of the engine E after the idle-stop.

According to this embodiment, the supply of oil to the clutch mechanism 3 (more particularly, the second clutch device 3*b* in this embodiment) can be prioritized by discharging oil accumulated in the accumulator 33 during operation of a vehicle on restart of the engine E after the idle-stop. Other configurations of the accumulator 33 can be used if it is connected operatively on the oil supply path of the clutch mechanism 3 from the oil pump 31 and the accumulated oil can be supplied to the clutch mechanism 3 by discharging it from the accumulator 33 on restart of the engine E after the idle-stop.

Figure 17:
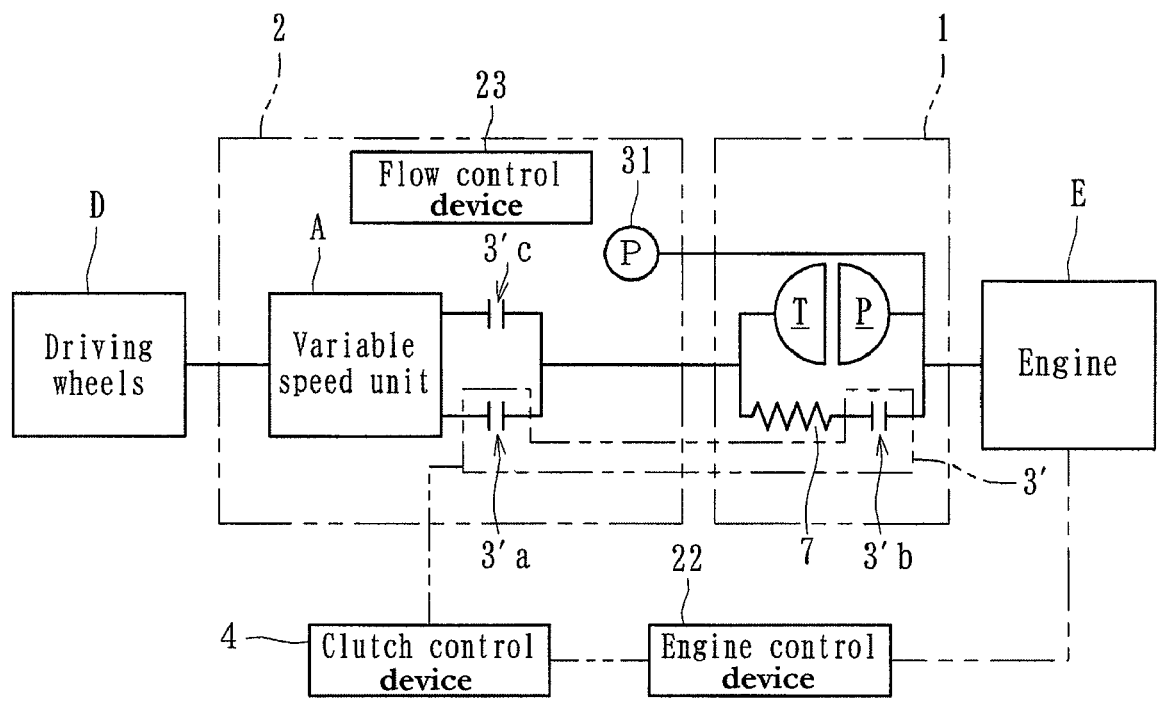
FIG. 17 is a schematic diagram of a power transmitting apparatus of a third embodiment.

A third embodiment of a power transmitting apparatus, like the first and second embodiments, can be configured to transmit or cut-off the driving force from an engine (driving source) of an automobile (vehicle) to or from the wheels (driving wheels). Such an apparatus can include, with reference to FIG. 17, a torque converter 1, a clutch mechanism 3', an oil pump 31, a clutch control device 4, a engine control device 22, a flow control device 23, a damper mechanism 7, and a reverse clutch device 3'*c*. The same reference numerals are used to designate structural elements in this embodiment as those used to designate similar structural elements in the first and second embodiments and therefore detailed description of them is not repeated.

The clutch mechanism 3' can comprise a forward-operation clutch device 3'*a* operated during forward vehicle operation and configured to transmit the driving power of the engine E to the driving wheels D via the power transmitting system of the torque converter 1 (the first power transmitting condition) and a lock-up clutch device 3'b configured to transmit the driving power of the engine E to the driving wheels D without the power transmitting system of the torque converter 1 (the second power transmitting condition), and the clutch control device 4 is configured to selectively operate the forward-operation clutch device 3'a and the lock-up clutch device 3'b in accordance with a condition of a vehicle to position them in either the first power transmitting condition or the second power transmitting condition.

The lock-up clutch device 3'b can be arranged within the torque converter 1 and can be configured to be connected to the turbine T of the torque converter 1 so that the torque converter cover and the turbine are directly connected via a clutch piston. The power transmitting apparatus of this third embodiment can be easily applied to a vehicle mounted with a lock-up clutch device (lock-up clutch) being comparatively in wide use.

The power transmitting apparatus of the present inventions have been described with reference to exemplifying embodiments. However, the present inventions are not limited to these illustrated embodiments and the clutch devices can be formed in other configurations.

Although it is described in the illustrated embodiments that the variable speed unit A is a continuously variable transmission (CVT), any automatic variable speed unit may be used other than the CVT. If an automatic variable speed unit is used as the variable speed unit A, the driving power and operating condition can be easily adjusted for high efficiency of fuel consumption. Furthermore, if a CVT is used as the variable speed unit A, the driving power and operating condition can be continuously adjusted for high efficiency of fuel consumption.

What is claimed is:

1. A power transmitting apparatus, comprising:
   a torque converter having a torque amplifying function;
   a clutch mechanism configured to be positioned in a first power transmitting condition in which driving power of an engine is transmitted to driving wheels via a power transmitting system of the torque converter and a second power transmitting condition in which the driving power of the engine is transmitted to the wheels without the power transmitting system of the torque converter;
   an oil pump driven by the driving power of the engine to supply oil to the clutch mechanism and the torque converter to operate them;
   a clutch control device configured to selectively operate the clutch mechanism in accordance with a vehicle condition to position the clutch mechanism in either the first power transmitting condition or the second power transmitting condition;
   an engine control device configured to idle-stop the engine by automatically stopping the engine when vehicle speed is reduced below a predetermined value and to restart the engine when an accelerator pedal is depressed or brakes are released during an idle-stop condition of the engine; and
   a flow control device configured to limit or prevent the supply of oil to the torque converter by the oil pump and to prioritize the supply of oil to the clutch mechanism when the engine is restarted by the engine control device after the idle-stopped condition.

2. The power transmitting apparatus of claim 1, wherein the flow control device comprises a hydraulic valve mechanism having a first supply path configured to supply oil to the torque converter, a second supply path configured to limit or prevent the supply of oil, and a valve configured to open and close the first supply path by hydraulic pressure.

3. The power transmitting apparatus of claim 2, wherein the valve is normally urged in a direction for closing the first supply path.

4. The power transmitting apparatus of claim 1, further comprising an accumulator configured to accumulate the oil and configured so that the oil accumulated in the accumulator is discharged therefrom to the clutch mechanism when the engine is restarted by the engine control device after the idle-stopped condition.

5. The power transmitting apparatus of claim 1, further comprising a detecting device configured to detect whether or not the clutch mechanism is in a state capable of transmitting power and wherein the limitation or prevention of the supply of oil to the torque converter by the flow control device is cancelled after the detecting device has detected the state capable of transmitting power.

6. The power transmitting apparatus of claim 1, wherein the engine is automatically restarted by the engine control device when a predetermined duration of time of the idle-stop condition has lapsed.

7. The power transmitting apparatus of claim 1, wherein the clutch mechanism comprises a first clutch device operated during forward vehicle operation and configured to transmit the driving power of the engine to the driving wheels via the power transmitting system of the torque converter and a second clutch device operated during forward vehicle operation and configured to transmit the driving power of the engine to the driving wheels without the power transmitting system of the torque converter, and wherein the clutch control device is configured to selectively operate the first clutch device and the second clutch device in accordance with the vehicle condition to position them in either the first power transmitting condition or the second power transmitting condition and the clutch control device is configured to operate only the second clutch device when the engine is restarted by the engine control device after the idle-stopped condition.

8. The power transmitting apparatus of claim 7, further comprising:
   a first driving shaft connected to the first clutch device and configured to be rotated by the driving power of the engine via the power transmitting system of the torque converter, and
   a second driving shaft connected to the second clutch device and configured to be rotated by the driving power of the engine without the power transmitting system of the torque converter, and
   wherein the first and second driving shafts are arranged coaxially with each other.

9. The power transmitting apparatus of claim 1, wherein the clutch mechanism comprises a forward-operation clutch device operated during forward vehicle operation and configured to transmit the driving power of the engine to the driving wheels via the power transmitting system of the torque converter and a lock-up clutch device configured to transmit the driving power of the engine to the driving wheels without the power transmitting system of the torque converter, and wherein the clutch control device is configured to selectively operate the forward-operation clutch device and the lock-up clutch device in accordance with the vehicle condition to position them in either the first power transmitting condition or the second power transmitting condition.

10. The power transmitting apparatus of claim 1, wherein an automatic variable speed unit is operatively positioned between the clutch mechanism and the driving wheels to transmit power from the engine to the driving wheels.

11. The power transmitting apparatus of claim 10, wherein the automatic variable speed unit is a continuously variable transmission.

12. The power transmitting apparatus of claim 1, wherein the torque converter and a transmission are operatively positioned to transmit power between the engine and the driving wheels and wherein the clutch mechanism and a variable speed unit are arranged within the transmission.

13. The power transmitting apparatus of claim 1, wherein the engine is automatically restarted by the engine control device when vehicle speed is increased under the idle-stop condition.

* * * * *